United States Patent Office 2,760,682
Patented Aug. 28, 1956

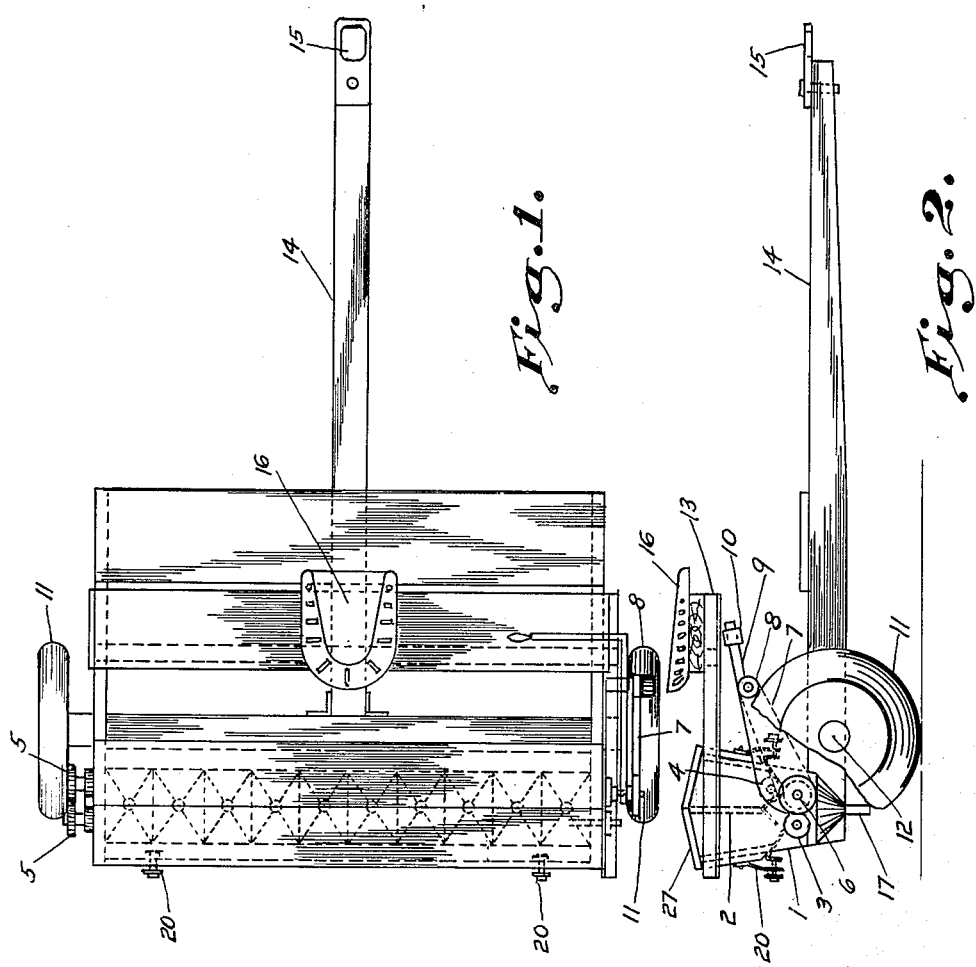

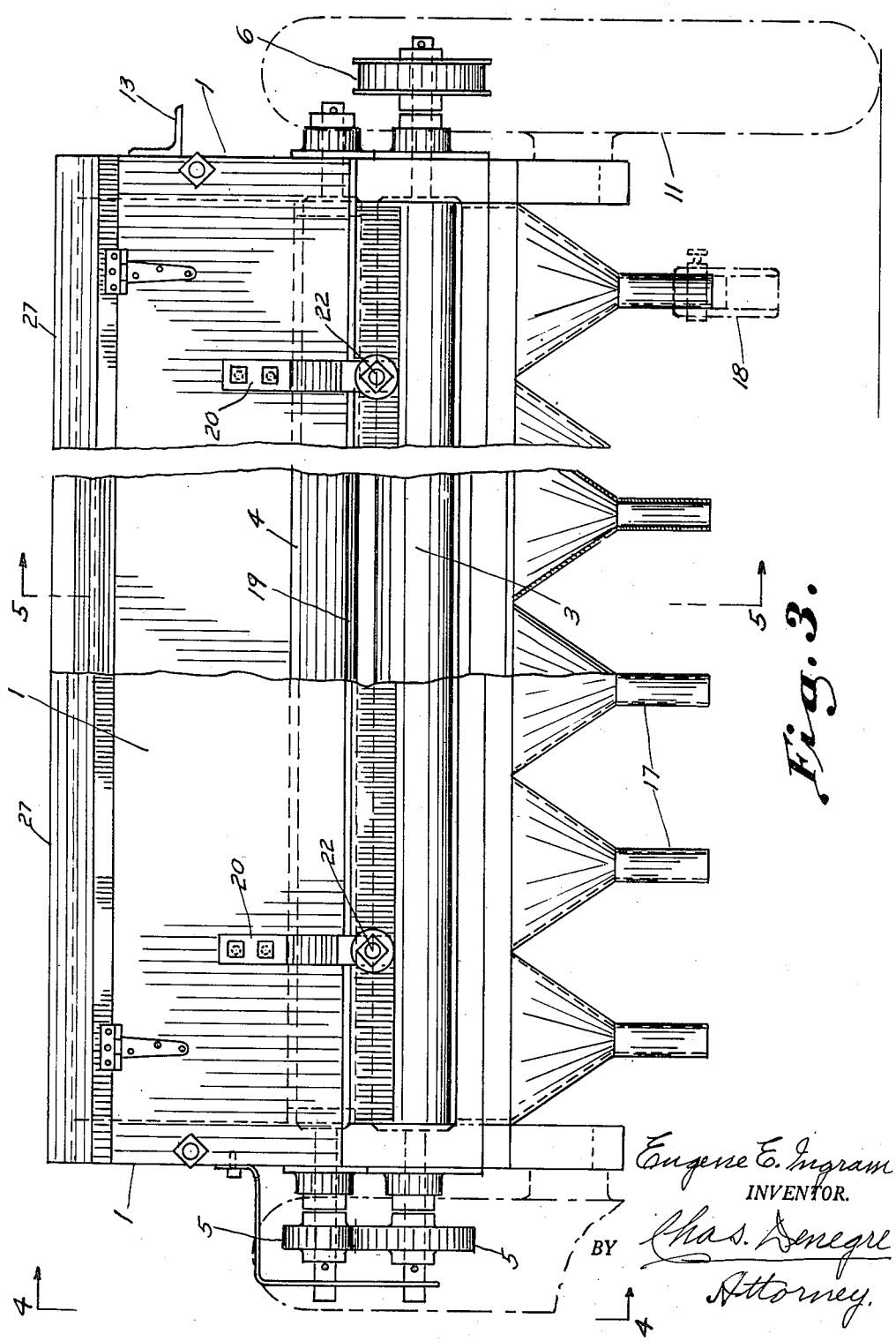

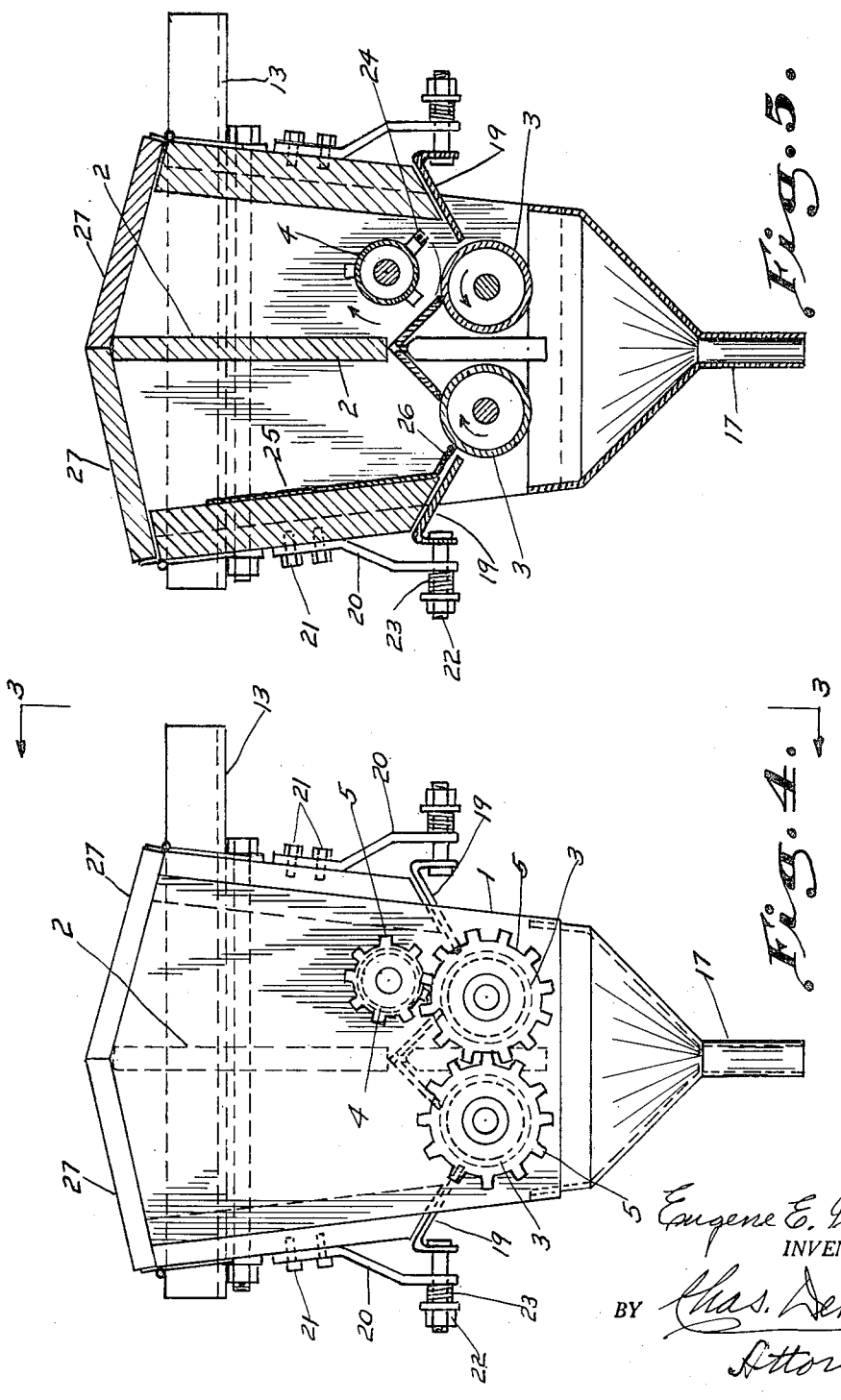

2,760,682

GRAIN AND COMMERCIAL FERTILIZER DISTRIBUTER

Eugene E. Ingram, Birmingham, Ala.

Application August 12, 1954, Serial No. 449,471

4 Claims. (Cl. 222—142)

This invention relates to a grain and commercial fertilizer distributer. It has for its main objects to provide such a distributer that will be highly satisfactory for the purpose intended, simple in structure, comparatively cheap to manufacture, easy to use and keep in working condition, and extremely durable.

A further object is to provide such a distributer that will be suitable to spread grain or commercial fertilizer in separated rows or over a wide planting bed.

Other objects and advantages will appear from the drawings and description.

By referring generally to the drawings, a part of this application, it will be observed that Fig. 1 is a plan view of a distributer made according to the present invention; Fig. 2 is a side elevational view of Fig. 1; Fig. 3 is an enlarged rear elevational view on line 3—3 of Fig. 4, part full, and part in section, of the distributer; Fig. 4 is a side elevational view on line 4—4 of Fig. 3; and Fig. 5 is a vertical sectional view on line 5—5 of Fig. 3.

Similar reference numerals refer to similar parts throughout the several views.

Referring to the drawings in detail it will be seen that the distributer comprises a hopper 1 with a partition 2, main rollers 3, an agitator 4, connecting gears 5, a pulley 6 connected by a belt 7 to another pulley 8 carried by an arm 9 with a weight 10 for holding the pulley 8 and roller in contact with the wheel 11. Also other means may be used for operating the rollers by having a pulley on the outer end 12 of the wheel axle. The assembled distributer is mounted upon the rear portion 13 of a carrier 14 having its front end provided with a link 15 for attachment to the rear of a trailer. A seat 16 is mounted upon the carrier. The outlets 17 are removably attached to the bottom of the hopper for use in distributing grain or commercial fertilizer in rows. If a wide spread is desired from the rollers the separate outlets 17 are removed. Also the outlets 17 may be provided with hose extensions 18 removably attached. Adjusting bracket plates 19 are provided for regulating the flow of grain or commercial fertilizer from the hopper. The bracket plates are carried on supports 20 attached to the hopper by cap bolts 21. Bolts 22 with springs 23 are for taking care of any slight variations between the bracket plates and rollers. The agitator is provided with a brush 24 for making contact with a roller for removing any commercial fertilizer that may cling to the roller. The hopper may be used entirely for spreading seed, but for fertilizer the half of hopper having the agitator therein must be used. A removable plate 25 with a bent end 26 is for use if only part of one roller is allowed to distribute grain or fertilizer. The hopper is provided with a hinged top 27.

The various parts of the distributer may be made of any material suitable for the purpose. Also it may be made in different sizes and capacities depending on how and where to be used.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

1. A grain and commercial fertilizer distributer mounted on a carrier having wheels, and comprising a hopper for containing said material, two similar rollers mounted in the bottom portion of the hopper, said rollers having connecting gears attached thereto and adapted to revolve said rollers toward each other downward, an agitator roller mounted parallel with and above one of the rollers, said agitator having a gear attached to one of its ends and in mesh with the gear on the adjacent roller, said agitator having a brush attached thereto and adapted to make contact with the adjacent roller when the rollers are being revolved, adjustable bracket plates attached to the sides of the hopper with their inner edges positioned near the outer surfaces of the rollers, said bracket plates having bolt and spring means for adjusting the inner edges of the bracket plates for the control of flow of material from the hopper; one of said rollers having a shaft extending from its end, a pulley mounted on the outer end of said shaft, a swingable arm attached on said shaft adjacent said pulley, a weight adjustably attached on the free end of said arm, a combined pulley and roller mounted on said arm, a belt leading from the pulley on the end of the roller shaft to the pulley adjacent the arm roller, said arm roller being adapted for making contact with a wheel of the carrier for revolving the main rollers and the agitator when the carrier is being pulled along by a tractor or the like, said carrier having a seat mounted on its rear portion and an attaching link on its towing end; a removable plate with a bent edge adapted for preventing the flow of material past one roller when the distributer is in operation.

2. A grain and commercial fertilizer distributer according to claim 1 and being further characterized by having an attachable discharge structure comprising a plurality of funnel-shaped outlets adapted for planting grain in separate rows, said outlets being adapted for pieces of hose to be removably attached thereto for lengthening the said outlets.

3. A grain and commercial fertilizer distributer comprising a carrier having wheels, a hopper mounted upon the carrier, revolvable rollers and an agitator mounted in the lower portion of the hopper, said rollers and agitator having gears in mesh with each other adapted to revolve the rollers and agitator, adjustable bracket plates as means for controlling the flow of material from said hopper, said hopper having a partition inserted removably in its center for use of two different materials simultaneously, a structure of a plurality of outlets adapted for removable attachment to the bottom of the hopper, said outlets being adapted for hose extensions to be attached thereto, pulley and belt means for connection with a wheel of the carrier for revolving said main rollers and agitator when said carrier is being towed by a tractor or the like, a removable plate with a bent edge for use in said hopper for preventing the flow of material past one of said rollers, said hopper having a two part cover attached by hinges to the tops of the sides of the hopper.

4. A grain and commercial fertilizer distributer of the character described comprising a carrier consisting of two wheels on an axle and having a towing bar attached thereto, a hopper mounted on the rear of the carrier, two similar rollers mounted in the bottom portion of the hopper, driving gears attached to said rollers as part of the means for revolving the rollers, said rollers being set for their top edges to revolve toward each other, a third roller with integral extensions as an agitator mounted parallel with and above one of the other rollers, said agitator roller having a gear attached to one of its ends and in mesh with a gear on the roller below it, an inverted V-shaped plate mounted in the center of the hopper with the lower edges of the V resting upon the two lower rollers, an adjustable bracket with an attached plate mounted in each of two walls of the hopper, an adjusting bolt connected to each of said plate brackets for the control of flow of material from the hopper by moving the inner edges of the plates toward or away from the rollers, a removable plate having its lower edge bent approximately L-shape and positioned adjacent one inner face of a wall of the hopper with its bent edge in contact with a roller for regulating the width of the flow of material past the roller said plate being of any length desired; one of said rollers having a shaft extending from its end, a pulley mounted on the outer end of said shaft, a swingable arm attached on said shaft adjacent said pulley, a weight adjustably attached on the free end of said arm, a combined pulley and roller mounted on said arm, a belt leading from the pulley on the end of the roller shaft to the pulley adjacent the arm roller, said arm roller being for use in making contact with a wheel of the carrier for revolving the main rollers and the agitator roller when the carrier is being pulled along by a tractor or the like.

References Cited in the file of this patent
UNITED STATES PATENTS

| | | |
|---|---|---|
| 20,049 | Donovan et al. | Apr. 27, 1858 |
| 221,408 | Hart | Nov. 11, 1897 |
| 367,608 | Edwards et al. | Aug. 2, 1887 |
| 905,395 | West | Dec. 1, 1908 |
| 2,242,093 | Stauffacher | May 13, 1941 |